United States Patent
Hee et al.

(10) Patent No.: US 6,301,309 B1
(45) Date of Patent: Oct. 9, 2001

(54) SIGNAL GATING CONTROLLER FOR ENHANCING CONVERGENCY OF MLT3 DATA RECEIVERS

(75) Inventors: Wong Hee, San Jose; Abhijit Phanse, Santa Clara, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/076,425

(22) Filed: May 12, 1998

Related U.S. Application Data

(60) Provisional application No. 60/069,027, filed on Dec. 10, 1997, provisional application No. 60/069,044, filed on Dec. 10, 1997, provisional application No. 60/069,031, filed on Dec. 10, 1997, provisional application No. 60/069,091, filed on Dec. 10, 1997, provisional application No. 60/069,030, filed on Dec. 10, 1997, provisional application No. 60/069,028, filed on Dec. 10, 1997, provisional application No. 60/069,029, filed on Dec. 10, 1997, and provisional application No. 60/067,764, filed on Dec. 10, 1997.

(51) Int. Cl.[7] .............................. H04L 25/34; H04L 25/49
(52) U.S. Cl. ............................................................ 375/286
(58) Field of Search ..................................... 375/286, 287; 327/3, 37, 40, 41, 47, 63, 65, 72, 74, 77, 82

(56) References Cited

U.S. PATENT DOCUMENTS 5,844,439 * 12/1998 Zortea .................................. 327/307
5,880,615 * 3/1999 Bazes .................................. 327/307

OTHER PUBLICATIONS

Kurt H. Mueller and Markus Müller, "Timing Recovery in Digital Synchronous Data Receiver", IEEE Transactions on Communications, vol. COM–24, No. 5, May 1976, pp. 516–531.

* cited by examiner

*Primary Examiner*—Chi Pham
*Assistant Examiner*—Jean B Corrielus
(74) *Attorney, Agent, or Firm*—Baker & McKenzie

(57) ABSTRACT

A signal gating controller for recovering true data signal pulses while gating out false data signal pulses which are generated and prevent convergence when recovering a multilevel data signal, such as an MLT3 Ethernet signal, which has been severely over-equalized. A signal slicing circuit generates two data peak signals: one data peak signal identifies occurrences of positive data signal peaks and is asserted when the input data signal level has transitioned beyond a value which is intermediate to preceding zero and positive peak signal levels; the other data peak signal identifies occurrences of negative data signal peaks and is asserted when the input data signal level has transitioned beyond a value which is intermediate to preceding zero and negative peak signal levels. A signal gating control circuit sequentially latches such data peak signals to produce two gating control signals. Logical combinations of such gating control and data peak signals produce gated signals in which the true data peak signal pulses remain while the false data peak signal pulses due to severe over-equalization of the incoming data signal are removed.

10 Claims, 3 Drawing Sheets

SIGNAL GATING CONTROLLER FOR ENHANCING CONVERGENCY OF MLT3 DATA RECEIVERS

A portion of the disclosure of this patent document contains material which is subject to copyright protection. The copyright owner has no objection to the facsimile reproduction by anyone of the patent document or the patent disclosure, as it appears in the patent and trademark office, patent file or records, but otherwise reserves all copyright rights whatsoever.

This application is submitted with a microfiche appendix containing copyrighted material, copyright 1996, National Semiconductor Corporation. Such appendix consists of 3 microfiche transparencies with a total of 293 frames.

RELATED APPLICATIONS

This application claims the benefit of and incorporates herein by reference the following U.S. provisional patent applications:

60/069,027, filed Dec. 10, 1997, entitled "Peak Error Detector"

60/069,044, filed Dec. 10, 1997, entitled "Signal Gating Controller For Enhancing Convergency of MLT3 Data Receivers"

60/069,031, filed Dec. 10, 1997, entitled "Digital Interface Circuit"

60/069,091, filed Dec. 10, 1997, entitled "Digital Signal Processing Control Circuit For Controlling Corrections of Input Data Signal Errors"

60/069,030, filed Dec. 10, 1997, entitled "Control Loop For Data Signal Baseline Correction"

60/069,028, filed Dec. 10, 1997, entitled "Control Loop For Adaptive Equalization of a Data Signal"

60/069,029, filed Dec. 10, 1997, entitled "Control Loop For Multilevel Sampling of a Data Signal"

60/067,764, filed Dec. 10, 1997, entitled "Data Signal Baseline Error Detector"

BACKGROUND OF THE INVENTION

1. Field of the Invention

The present invention relates to circuits for selectively gating data signals, and in particular, to signal gating controllers for selectively gating out undesired pulses from improperly equalized data signals.

2. Description of the Related Art

Recovering data from data signals which have been transmitted over long lengths of cable at high data rates requires that such data signals be equalized in order to compensate for the signal loss and phase dispersion characteristics of the cable. Further, in those applications where the cable length may vary, such equalization must be capable of adapting according to the length of the cable. Conventional adaptive equalization is typically accomplished through the use of a feedback control signal having an amplitude which is proportional to the pulse height of the equalized data signal. However, such a technique for controlling the adaptive equalization process is very sensitive to amplitude errors in the incoming data signal and can often result in under-equalized or over-equalized signals. In such improperly equalized signals, false signal peaks can occur which result in false, and therefore undesired, decoded data pulses. Accordingly, it would be desirable to have a signal gating controller capable of gating out such false decoded data pulses and thereby compensate for improperly equalized signals.

SUMMARY OF THE INVENTION

A signal gating controller in accordance with the present invention monitors an equalized data signal and provides gating control signals for gating out false signal pulses caused by improper equalization of the original incoming data signal. Such a gating controller is particularly advantageous for use with a circuit for detecting and identifying valid detected errors in the signal peaks within such input data signal, such as that disclosed in co-pending, commonly assigned U.S. Pat. application Ser. No. 09/076,186, filed May 12, 1998, and entitled "Peak Error Detector" (attorney docket no. NSC1-A9010), the disclosure of which is incorporated herein by reference.

In accordance with one embodiment of the present invention, a signal gating control circuit includes a data signal level detection circuit and a gating control signal circuit. The data signal level detection circuit is configured to receive and detect an input data signal which includes a plurality of signal levels representing an N-level data signal and in accordance therewith provide first and second data peak signals. The input data signal includes, associated therewith: sequential intermediate signal levels, sequential positive peak signal levels each of which is positive with respect to a preceding one of the sequential intermediate signal levels, and sequential negative peak signal levels each of which is negative with respect to a preceding one of the sequential intermediate signal levels. The first data peak signal includes primary and secondary first data peak signal pulses which are asserted when the input data signal level has transitioned beyond a first predetermined value. The second data peak signal includes primary and secondary second data peak signal pulses which are asserted when the input data signal level has transitioned beyond a second predetermined value. The secondary first and second data peak signal pulses are asserted immediately subsequent to de-assertion of the primary second and first data peak signal pulses, respectively. The first predetermined value corresponds to a first value which is between a preceding one of the plurality of sequential intermediate signal levels and a first preceding one of the pluralities of sequential positive and negative peak signal levels. The second predetermined value corresponds to a second value which is between a preceding one of the plurality of sequential intermediate signal levels and a second preceding one, which is opposite to the first preceding one, of the pluralities of sequential positive and negative peak signal levels. The gating control signal circuit is coupled to the data signal level detection circuit and is configured to receive and process the first and second data peak signals and in accordance therewith provide first and second gating control signals, respectively. Logical combinations of the first and second gating control signals and the second and first data peak signals provide third and fourth data peak signals in which the primary second and first data peak signal pulses remain and the secondary second and first data peak signal pulses are removed, respectively.

These and other features and advantages of the present invention will be understood upon consideration of the following detailed description of the invention and the accompanying drawings.

DETAILED DESCRIPTION OF THE INVENTION

Figure 1:
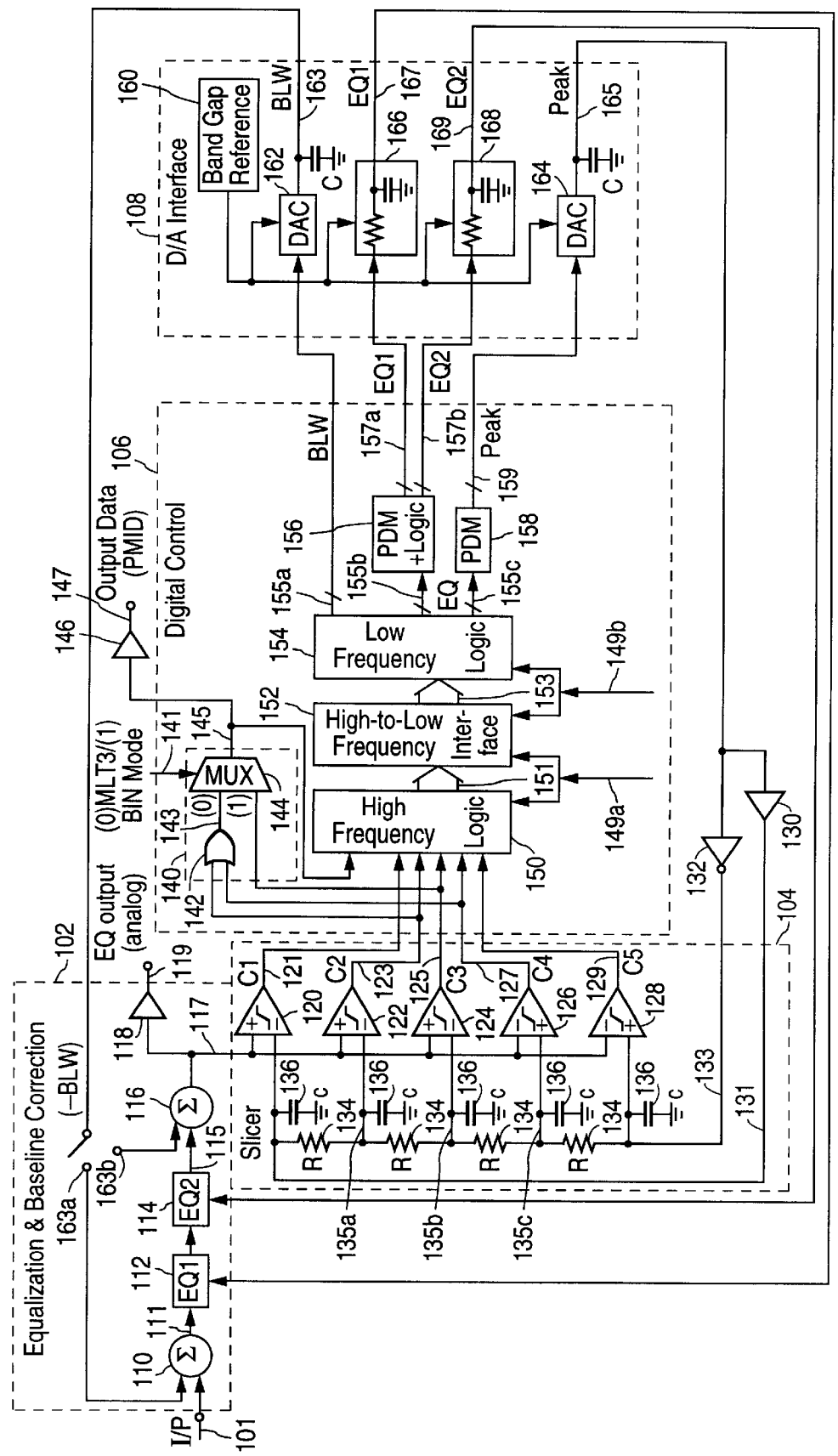
FIG. 1 is a functional block diagram of a high speed data receiver in which a signal gating controller in accordance with the present invention can be advantageously used.

Referring to FIG. 1, a circuit in accordance with the present invention is advantageous for use in a high speed data receiver 100 which receives binary or MLT3 encoded data which has been transmitted via a cable (e.g., fast Ethernet). As discussed in more detail below, such a data receiver 100 provides adaptive equalization and dynamic slicing and baseline restoration of the data signal. (Each of the circuit functions or stages as represented in FIG. 1 and discussed below are described in detail in the code listings provided in the microfiche appendix hereto, the contents of which are incorporated herein by reference. A description of a similar data receiver can be found in commonly assigned U.S. Pat. No. 5,940,442, and entitled "High Speed Data Receiver," the disclosure of which is incorporated herein by reference.)

This data receiver 100 includes a correction stage 102, a slicer stage 104, a digital control stage 106 and a digital-to-analog (D/A) interface 108. As discussed in more detail below, the correction stage 102 provides for equalization and baseline wander correction of the input data signal 101. The slicer stage 104 slices the resulting equalized, corrected data signal 117. The digital control stage 106 processes some of the sliced data signals to produce an output digital data signal 147, as well as generate a number of digital control signals 155a, 157a, 157b, 159 for controlling the equalization, baseline wander correction and slicing of the input data signal 101. The D/A interface 108 converts such digital control signals 155a, 157a, 157b, 159 into corresponding analog signals 163, 165, 167, 169 for actually providing such control of the equalization, baseline wander correction and slicing of the input data signal 101.

The incoming data signal 101, which has been received via a long cable of variable length (not shown), is selectively combined with a baseline correction signal 163 (discussed further below) in a signal summer 110. The corrected signal 111 is selectively amplified by a series of adaptive equalizers, 112, 114, which each have a signal gain which increases with frequency in accordance with their respective equalizer control signals 167, 169. The resulting equalized signal 115 is selectively combined with an alternative baseline correction signal 163 in another signal summer 116. (For testing purposes, the final equalized, corrected data signal 117 is buffered by an analog buffer amplifier 118 to be provided as an analog, equalized, corrected output data signal 119, and is also provided to the signal slicer 104.)

A description of a signal equalization technique using a series of signal equalizers in this manner can be found in commonly assigned U.S. Pat. No. 5,841,810, and entitled "Multiple Stage Adaptive Equalizer," the disclosure of which is incorporated herein by reference.

The slicer 104 receives and slices the equalized, corrected data signal 117 in accordance with positive 131 and negative 133 data peak reference signals using a set of voltage comparators 120, 122, 124, 126, 128. The positive 131 and the negative 133 data peak reference signals are the buffered, non-inverted and inverted versions of a data peak signal 165 (discussed further below) as generated by non-inverting 130 and inverting 132 buffer amplifiers, respectively. These data peak reference signals 131, 133 are applied differentially across a resistive voltage divider with four resisters 134, thereby generating five respective reference signals 131, 135a, 135b, 135c, 133, each of which is filtered by a capacitor 136 for use as a reference signal for its respective voltage comparator 120, 122, 124, 126, 128. Based upon these reference signals, 131, 135a, 135b, 135c, 133, each comparator 120, 122, 124, 126, 128 produces a respective binary output signal 121, 123, 125, 127, 129, each of which is asserted at a logic one level when the data signal 117 transcends the value of the corresponding reference input signal 131, 135a, 135b, 135c, 133.

For example, for the positive 120 and negative 128 peak voltage comparators, the positive 131 and negative 133 data peak reference signals serve as their reference signals, respectively. The middle reference signal 135b represents the mean (e.g., zero or baseline) and serves as the reference signal for the middle comparator 124. The remaining positive reference signal 135a represents a voltage between the mean voltage 135b and the positive peak voltage 131 and serves as the reference for the positive level comparator 122. Similarly, the remaining negative reference 135c represents a voltage between the mean voltage 135b and the negative peak voltage 133 and serves as the reference for the negative level comparator 126.

The binary data signals 121, 123, 125, 127, 129 are received and processed by the digital control stage 106 as follows. The mean 125, positive 123 and negative 127 data signals are processed by a decoder 140 to produce a data signal 145 which is buffered by a buffer amplifier 146 to produce the output digital data signal 147. The positive 123 and negative 127 data signals are logically summed in an OR Gate 142. Then, either the resulting logical sum signal 143 or mean data signal 125 is selected with a multiplexor 144 in accordance with a control signal 141, depending upon whether the original input data signal 101 is an MLT3 or binary signal. This data signal 145 and the binary data signals 121, 123, 125, 127, 129 are received and processed by a high frequency logic stage 150 in accordance with a high frequency clock signal 149a.

The high frequency logic stage 150 processes its input signals 145, 121, 123, 125, 127, 129 in a number of ways to produce a set 151 of digital signals which are then converted to a corresponding set 153 of digital signals at a lower frequency by the high-to-low frequency stage 152 in accordance with the high frequency clock signal 149a and a low frequency clock signal 149b. (By way of example, for fast Ethernet, the high frequency clock signal 149a has a frequency in the hundreds of megahertz and the low frequency clock signal 149b has a frequency in the tens of megahertz.) One operation performed by the high frequency logic stage 150 is that of peak error signal detection, whereby multiple peak error signals representing variations in the signal peaks within selected frequency bands of the incoming data signal are generated and validated so as to identify the occurrence of errors between the peak of the present incoming data signal and estimated peak values of prior incoming data signals within different time windows. A description of this peak error detection circuit can be found in the aforementioned patent application entitled "Peak Error Detector". Another operation performed is that of baseline error detection, whereby a baseline error signal which is generated during an intermediate level state of the multiple level data signal 117 (such as the zero-state of an MLT3 signal) is validated, thereby identifying the occurrence of an error between the baseline of the incoming data signal and an estimated baseline level. A description of this baseline error validation circuit can be found in commonly assigned U.S.

Pat. No. 6,044,489, and entitled "Data Signal Baseline Error Detector" (attorney docket no. NSC1-C1010), the disclosure of which is incorporated herein by reference. As discussed in more detail below, yet another operation performed is that of generating gating control signals for gating out false signal pulses caused by improper equalization of the original incoming data signal 101.

The low frequency logic stage 154, in accordance with the low frequency clock signal 149$b$, processes these lower frequency signals 153 to produce a number of digital control signals 155$a$, 155$b$, 155$c$. More specifically, the low frequency logic stage 154 processes the lower frequency error signals 153 to produce control signals for compensating for variations in peak signal values and correcting errors in the baseline of the incoming data signal 111/115, as well as controlling the equalization of the incoming data signal 111. A more detailed description of the low frequency logic stage 154 can be found in co-pending, commonly assigned U.S. patent application Ser. No. 09/076,185, filed May 12, 1998, and entitled "Distributive Encoder For Encoding Error Signals Which Represent Signal Peak Errors In Data Signals For Identifying Erroneous Signal Baseline, Peak And Equalization Conditions" (attorney docket no. NSC1-C0610), the disclosure of which is incorporated herein by reference.

The high-to-low frequency interface 152, in accordance with the high 149$a$ and low 149$b$ frequency clock signals, converts the incoming error signals 151 to a corresponding set 153 of lower frequency error signals. A more detailed description of this interface 152 can be found in co-pending, commonly assigned U.S. patent application Ser. No. 09/076, 263, filed May 12, 1998, and entitled "Digital Interface Circuit" (attorney docket no. NSC1-C0510), the disclosure of which is incorporated herein by reference.

One set 155$a$ of control signals produced by the low frequency logic stage 154 is used for correcting baseline wander of the original input data signal 101. This set 155$a$ of digital signals is converted to an analog baseline wander control signal 163 by way of a digital-to-analog converter 162. This analog control signal 163 is then summed with either the original input data signal 101 or the equalized input data signal 115, as discussed above.

Another set 155$b$ of control signals is used to generate the equalization control signals 167, 169 for the adaptive equalizers 112, 114 (discussed above). This set 155$b$ of signals is processed using a circuit 156 which includes a pulse density modulator and some associated logic circuitry to produce, in turn, two pulse density modulated control signals 157$a$, 157$b$ for controlling the two adaptive input signal equalizers 112, 114. Each of these signals 157$a$, 157$b$ is converted to its respective analog control signal 167, 169 with a resistive-capacitive digital-to-analog conversion circuit 166, 168. A more detailed description of this signal converter can be found in co-pending, commonly assigned U.S. Pat. Ser. No. 5,784,019, and entitled "Distributive Digital-to-Analog Converter," the disclosure of which is incorporated herein by reference.

Yet another set of control signals 155$c$ is used to generate an analog peak signal 165 which is used to generate the differential peak reference signals 131, 133 for the slicer 104, as discussed above. These digital signals 155$c$ are converted with a pulse density modulator 158 to produce a set 159 of pulse density modulated signals which, in turn, are then converted to the analog peak signal 165 by a digital-to-analog converter 164.

Figure 2:
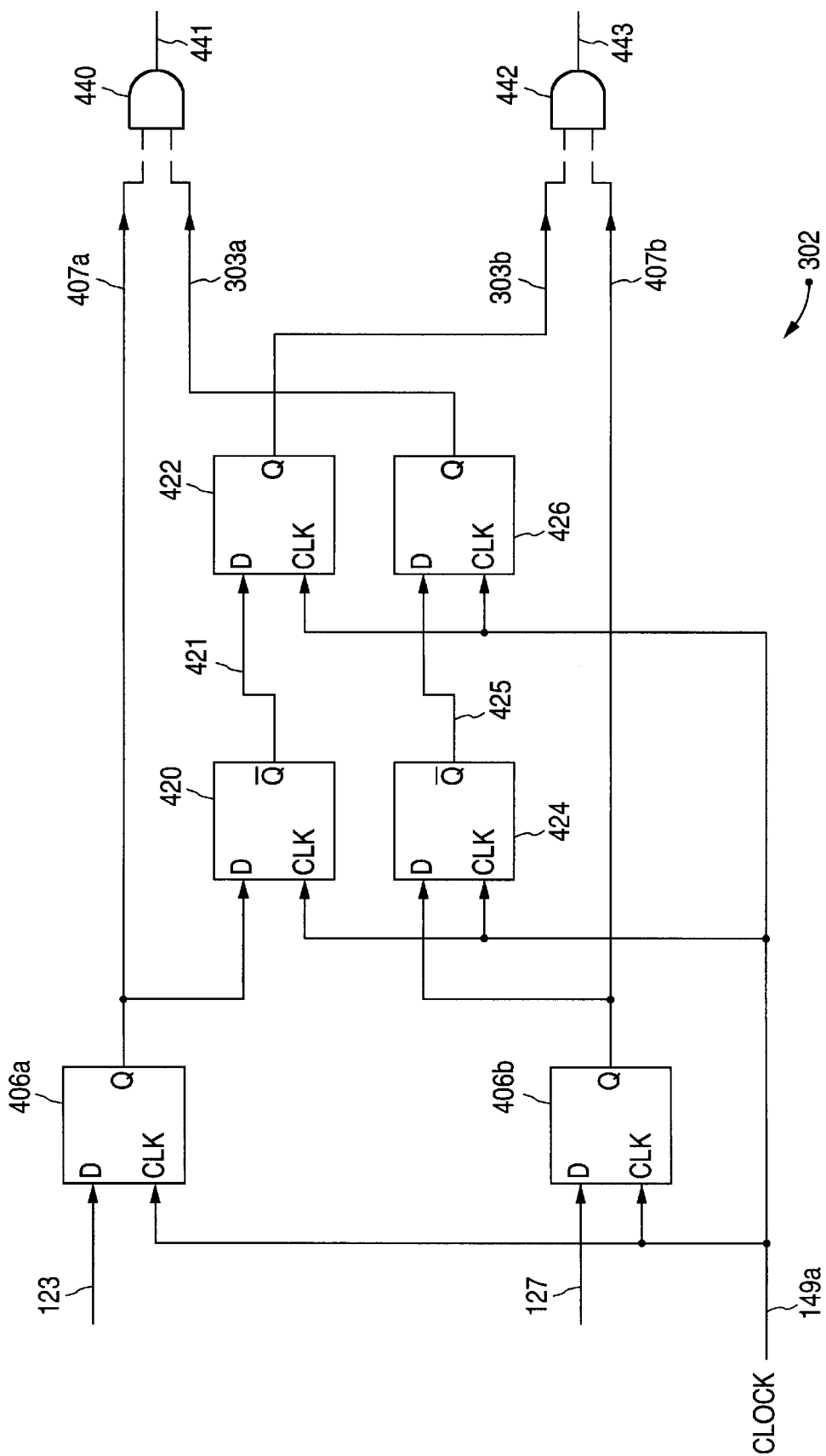
FIG. 2 is a functional block diagram of a signal gating control circuit which when used with the signal slicer of FIG. 1 forms a signal gating controller in accordance with one embodiment of the present invention.

Referring to FIG. 2, the gating controller 302 includes digital logic which forms a number of D-type flip-flops 406$a$, 406$b$, 420, 422, 424, 426, interconnected substantially as shown. The positive data signal 123 and negative data signal 127 from the signal slicer (FIG. 1) are received and latched by the input flip-flops 406$a$, 406$b$ in accordance with a clock signal 149$a$. The latched output signals 407$a$, 407$b$ form the decoded data signals which are to be gated so as to gate out any false data pulses due to improper signal equalization (discussed in more detail below). These latched signals 407$a$, 407$b$ are further latched by respective flip-flops 420, 424. In turn, the inverse latched signals 421, 425 are latched still further by respective flip-flops 422, 426. The final latched signals form the positive 303$a$ and negative 303$b$ gating control signals for the positive 308 and negative 316 peak error detectors, respectively (discussed in the aforementioned patent application entitled "Peak Error Detector"). For example, the positive 303$a$ and negative 303$b$ gating control signals can be logically ANDed with the latched positive 407$a$ and negative 407$b$ data signals in AND gates 440, 442, respectively.

Figure 3:
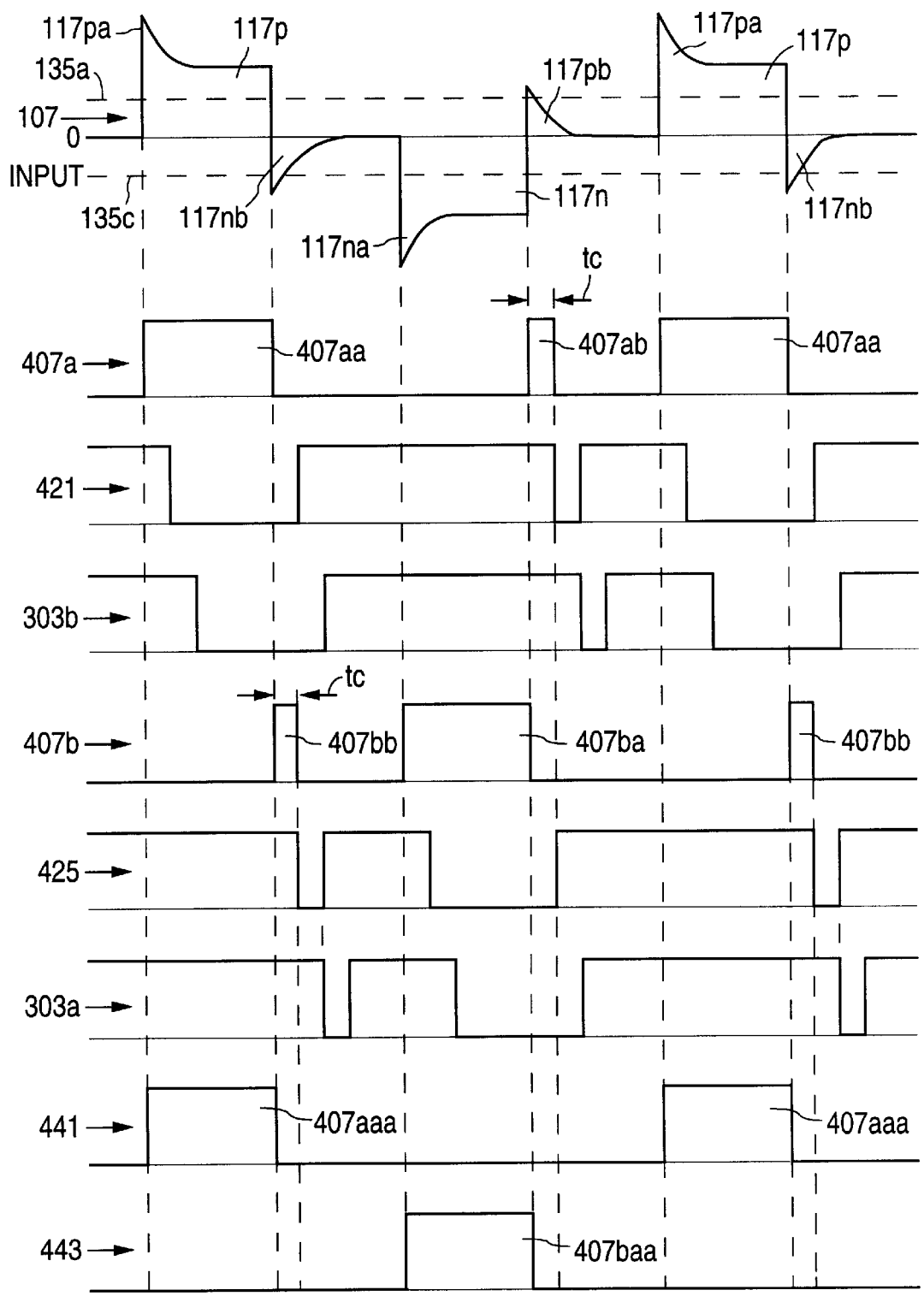
FIG. 3 is a signal timing diagram for the signal gating controller formed by the circuits of FIGS. 1 and 2.

Referring to FIG. 3, the operation of the gating controller 302 of FIG. 2 can be better understood. When improper signal equalization occurs, the input data signal 117, in addition to the true, or desired, positive 117$p$ and negative 117$n$ signal pulses, includes positive 117$pa$ and negative 117$na$ leading edge signal peaks, plus false positive 117$pb$ and false negative 117$nb$ trailing edge signal peaks. The false trailing edge signal peaks 117$pb$, 117$nb$ are of particular concern since their peak signal excursions can extend beyond the positive 135$a$ and negative 135$c$ reference signals (FIG. 1), thereby resulting in false data pulses 407$ab$, 407$bb$ within the latched data signals 407$a$, 407$b$. Hence, in addition to the true positive 407$aa$ and negative 407$ba$ signal pulses, the latched data signals 407$a$, 407$b$ may include false data pulses 407$ab$, 407$bb$, each of which typically has a pulse duration $t_c$ equal to one period of the clock signal 149$a$.

As shown in FIG. 3, the positive 303$a$ and negative 303$b$ gating control signals are generated by successive latching, with intermediate inversions, of the latched negative 407$b$ and positive 407$a$ data signals, respectively. When the positive gating control signal 303$a$ and positive latched data signal 407$a$ are logically ANDed, the resulting gated positive data signal 441 contains only true data pulses 407$aaa$. Similarly, the gated negative data signal 443 includes only true data pulses 407$baa$.

From the foregoing it can be seen that using a signal gating controller in accordance with the present invention can advantageously improve the convergencies of the control loops within a high speed data receiver 100 (FIG. 1), including those used to track the incoming data signal peaks, correct incoming data signal baseline wander and adaptively equalize the incoming data signal, even where the incoming data signal has been severely over-equalized.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a signal gating controller comprising:
   a data signal level detection circuit configured to receive and detect an input data signal which includes a plurality of signal levels representing an N-level data signal and in accordance therewith provide first and second data peak signals, wherein
      said input data signal includes, associated therewith,
         a plurality of intermediate signal levels,
            a plurality of positive peak signal levels each of which is positive with respect to a preceding one of said plurality of intermediate signal levels, and
            a plurality of negative peak signal levels each of which is negative with respect to a preceding one of said plurality of intermediate signal levels,
         said first data peak signal includes primary and secondary first data peak signal pulses which are asserted when said input data signal level has transitioned beyond a first predetermined value,
         said second data peak signal includes primary and secondary second data peak signal pulses which are asserted when said input data signal level has transitioned beyond a second predetermined value,
         said secondary first and second data peak signal pulses are asserted immediately subsequent to de-assertion of said primary second and first data peak signal pulses, respectively,
         said first predetermined value corresponds to a first value which is between a preceding one of said plurality of intermediate signal levels and a first preceding one of said pluralities of positive and negative peak signal levels, and
         said second predetermined value corresponds to a second value which is between a preceding one of said plurality of intermediate signal levels and a second preceding one, which is opposite to said first preceding one, of said pluralities of positive and negative peak signal levels; and
   a signal gating control circuit, coupled to said data signal level detection circuit, configured to receive and process said first and second data peak signals and in accordance therewith provide first and second gating control signals, respectively, wherein first and second logical combinations of said first and second gating control signals and said second and first data peak signals provide third and fourth data peak signals in which said primary second and first data peak signal pulses remain and said secondary second and first data peak signal pulses are removed, respectively.

2. The apparatus of claim 1, wherein said data signal level detection circuit comprises:
   a reference signal source configured to provide first and second reference signals having first and second reference signal values which correspond to said first and second predetermined values, respectively; and
   a signal comparison circuit, coupled to said reference signal source, configured to receive and compare said input data signal with said first and second reference signals and in accordance therewith provide said first and second data peak signals.

3. The apparatus of claim 2, wherein:
   said reference signal source comprises a voltage divider circuit configured to receive and divide first and second voltages having values which correspond to a preceding one of said plurality of positive peak signal levels and a preceding one of said plurality of negative peak signal levels, respectively, and in accordance therewith provide first and second reference voltages as said first and second reference signals, respectively; and
   said signal comparison circuit comprises first and second voltage comparators, coupled to said voltage divider circuit, configured to receive and compare said input data signal with said first and second reference voltages and in accordance therewith provide said first and second data peak signals, respectively.

4. The apparatus of claim 1, wherein said signal gating control circuit comprises:
   a first signal latching circuit configured to receive and sequentially latch said first data peak signal and in accordance therewith provide said first gating control signal; and
   a second signal latching circuit configured to receive and sequentially latch said second data peak signal and in accordance therewith provide said second gating control signal.

5. The apparatus of claim 1, further comprising:
   a first logic circuit configured to receive and logically combine said first gating control signal and said second data peak signal and in accordance therewith provide said third data peak signal in which said primary second data peak signal pulse remains and said secondary second data peak signal pulse is removed; and
   a second logic circuit configured to receive and logically combine said second gating control signal and said first data peak signal and in accordance therewith provide said fourth data peak signal in which said primary first data peak signal pulse remains and said secondary first data peak signal pulse is removed.

6. A method of generating a plurality of gating control signals, said method comprising the steps of:
   receiving and detecting an input data signal which includes a plurality of signal levels which represent an N-level data signal and in accordance therewith generating first and second data peak signals, wherein
      said input data signal includes, associated therewith,
         a plurality of intermediate signal levels,
            a plurality of positive peak signal levels each of which is positive with respect to a preceding one of said plurality of intermediate signal levels, and
            a plurality of negative peak signal levels each of which is negative with respect to a preceding one of said plurality of intermediate signal levels,
         said first data peak signal includes primary and secondary first data peak signal pulses which are asserted when said input data signal level has transitioned beyond a first predetermined value,
         said second data peak signal includes primary and secondary second data peak signal pulses which are asserted when said input data signal level has transitioned beyond a second predetermined value,
         said secondary first and second data peak signal pulses are asserted immediately subsequent to de-assertion of said primary second and first data peak signal pulses, respectively,
         said first predetermined value corresponds to a first value which is between a preceding one of said plurality of intermediate signal levels and a first preceding one of said pluralities of positive and negative peak signal levels, and
         said second predetermined value corresponds to a second value which is between a preceding one of said plurality of intermediate signal levels and a second preceding one, which is opposite to said first preceding one, of said pluralities of positive and negative peak signal levels; and processing said first and second data peak signals and in accordance therewith generating first and second gating control signals, respectively, wherein first and second logical combinations of said first and second gating control signals and said second and first data peak signals provide third and fourth data peak signals in which said primary second and first data peak signal pulses remain and said secondary second and first data peak signal pulses are removed, respectively.

7. The method of claim 6, wherein said step of receiving and detecting an input data signal which includes a plurality of signal levels which represent an N-level data signal and in accordance therewith generating first and second data peak signals comprises:

generating first and second reference signals having first and second reference signal values which correspond to said first and second predetermined values, respectively; and comparing said input data signal with said first and second reference signals and in accordance therewith generating said first and second data peak signals.

8. The method of claim 7, wherein:

said step of generating first and second reference signals having first and second reference signal values which correspond to said first and second predetermined values, respectively, comprises receiving and dividing first and second voltages which have values corresponding to a preceding one of said plurality of positive peak signal levels and a preceding one of said plurality of negative peak signal levels, respectively, and in accordance therewith generating first and second reference voltages as said first and second reference signals, respectively; and said step of comparing said input data signal with said first and second reference signals and in accordance therewith generating said first and second data peak signals comprises comparing said input data signal with said first and second reference voltages and in accordance therewith generating said first and second data peak signals, respectively.

9. The method of claim 6, wherein said step of processing said first and second data peak signals and in accordance therewith generating first and second gating control signals comprises:

sequentially latching said first data peak signal and in accordance therewith generating said first gating control signal; and sequentially latching said second data peak signal and in accordance therewith generating said second gating control signal.

10. The method of claim 6, further comprising the steps of:

logically combining said first gating control signal and said second data peak signal and in accordance therewith generating said third data peak signal in which said primary second data peak signal pulse remains and said secondary second data peak signal pulse is removed; and logically combining said second gating control signal and said first data peak signal and in accordance therewith generating said fourth data peak signal in which said primary first data peak signal pulse remains and said secondary first data peak signal pulse is removed.

* * * * *